United States Patent

[11] 3,627,896

[72] Inventor Saburo Uemura
   Kanagawa-ken, Japan
[21] Appl. No. 30,775
[22] Filed Apr. 22, 1970
[45] Patented Dec. 14, 1971
[73] Assignee Sony Corporation
   Tokyo, Japan
[32] Priority Apr. 24, 1969
[33] Japan
[31] 44/31671

[54] SWITCH DEVICE
9 Claims, 25 Drawing Figs.

[52] U.S. Cl. .................................................. 84/1.01,
   84/DIG. 4, 84/1.17, 310/156, 318/138, 307/88 P
[51] Int. Cl. .................................................. G01h 1/00,
   H02k 29/00
[50] Field of Search .......................................... 310/46,
   156; 318/138, 254; 84/1.01, 1.01 D, 1.15; 307/88 P

[56] References Cited
UNITED STATES PATENTS
3,313,877 4/1967 Boenning .................... 84/1.01
3,395,328 7/1968 Huntzinger et al. ........... 318/138
3,184,601 5/1965 Kosonocky et al. ........... 307/88 P
3,381,138 4/1968 Oshima et al. ................ 307/88 P Primary Examiner—L. T. Hix
Attorneys—Lewis H. Eslinger, Alvin Sinderbrand and Curtis, Morris & Safford ABSTRACT: A switch device has a saturable core, as in a parametron or dual-gap magnetic head, a first winding on the core receiving an AC exciting current and a DC bias current, a second winding on the core included in a resonant circuit in which a current is generated at a resonant frequency half that of the AC exciting current only when the total direct magnetic flux influencing the second winding is within predetermined limits, and a source of additional direct magnetic flux, such as a magnet, is actuable, as by movement relative to the core, to selectively apply direct magnetic flux to the second winding for coaction with the direct magnetic flux resulting from the DC bias current in determining the total direct magnetic flux influencing the second winding, whereby the generation of current in the resonant circuit, and hence the appearance of a resulting output signal from the switch device, may be controlled by movement of the magnet relative to the core.

INVENTOR
SABURO UEMURA

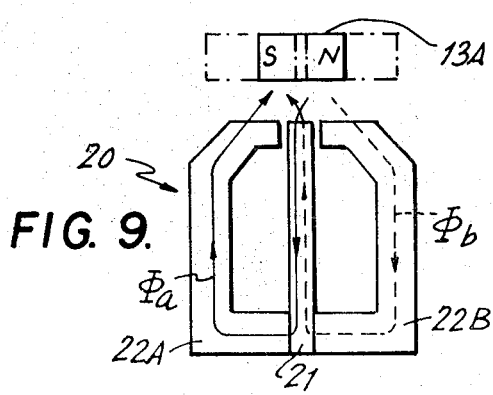
FIG. 9.
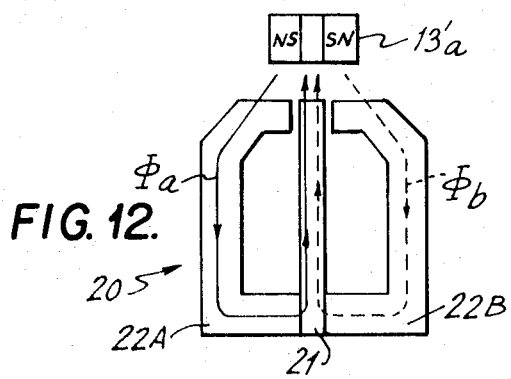
FIG. 12.
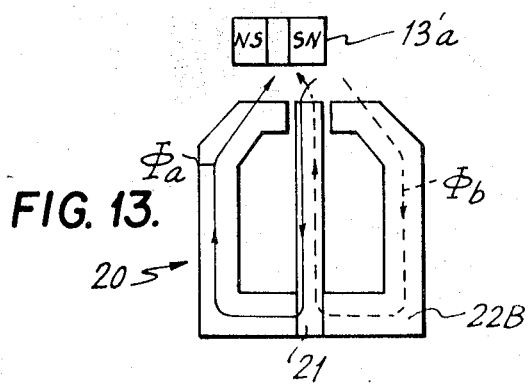
FIG. 13.
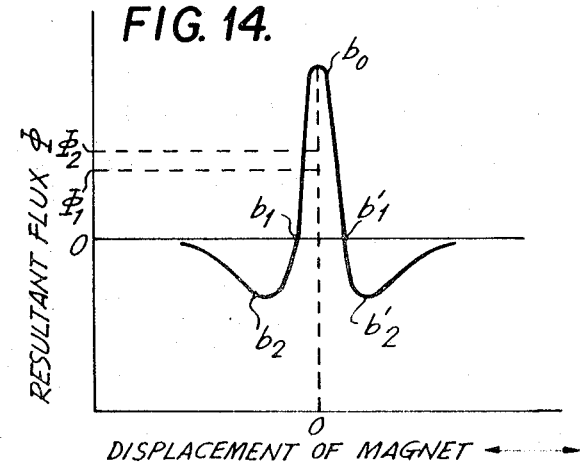
FIG. 10.
FIG. 11.
FIG. 14.
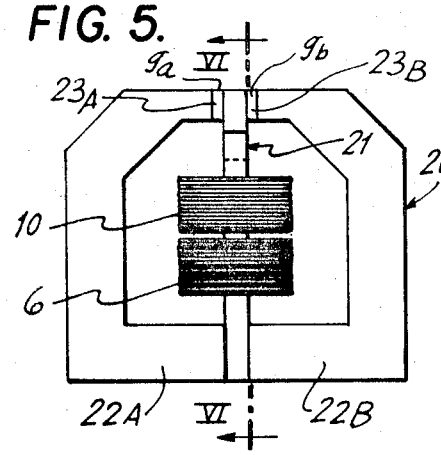
FIG. 5.
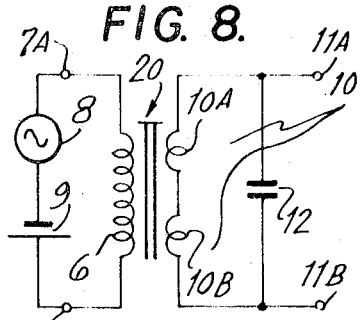
FIG. 6.
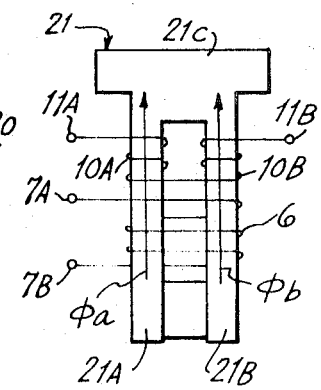
FIG. 8.
INVENTOR
SABURO UEMURA
BY
ATTORNEY

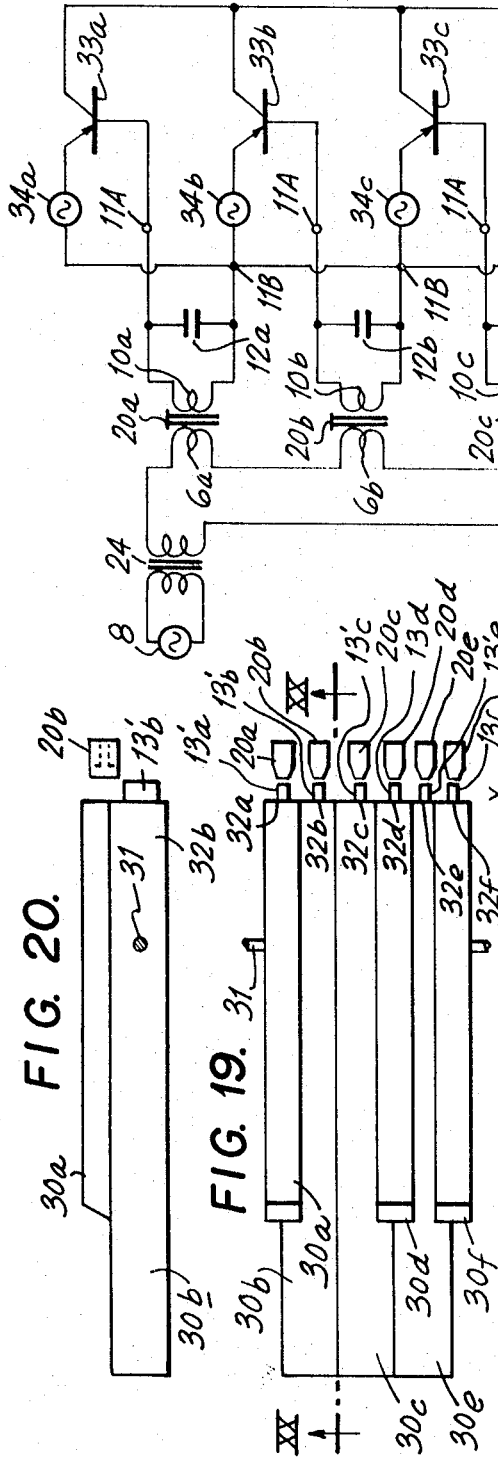

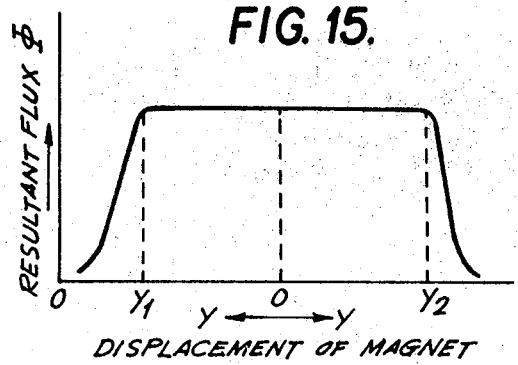
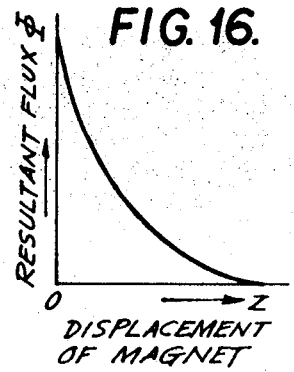
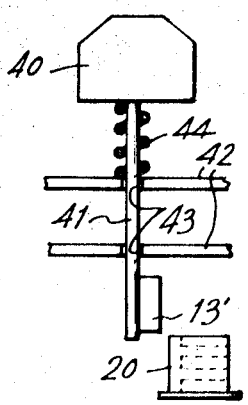
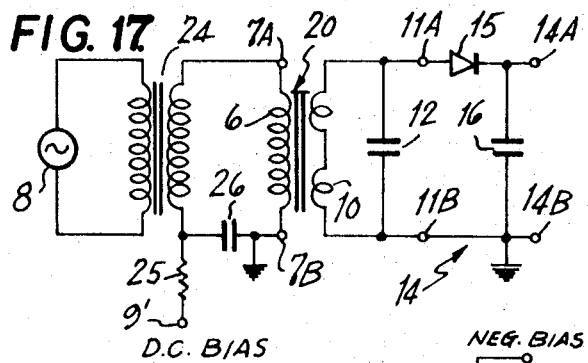
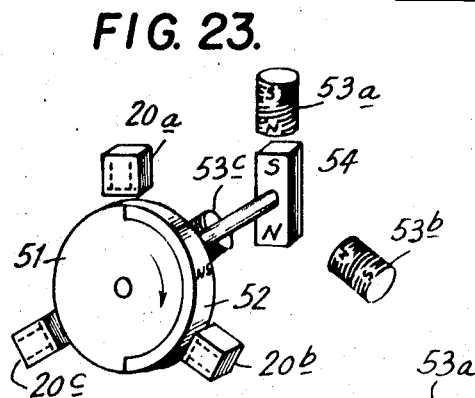
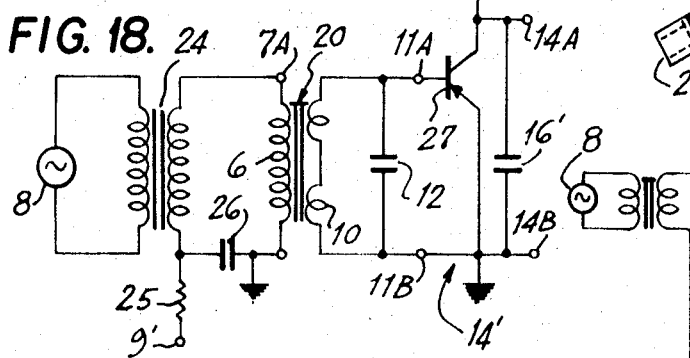
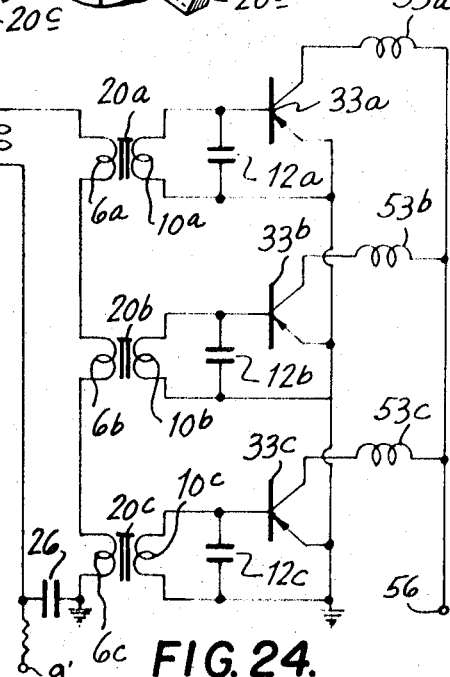
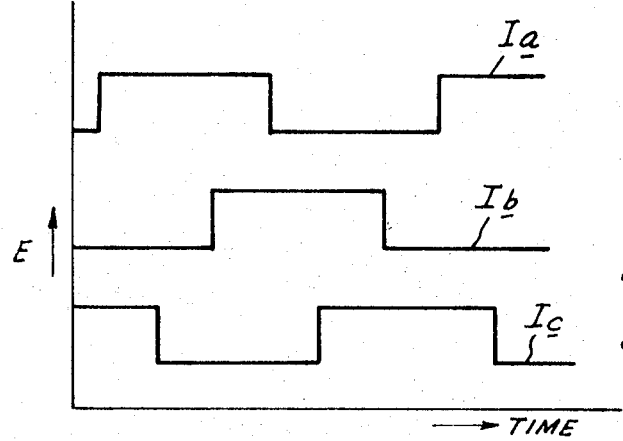
INVENTOR
SABURO UEMURA
BY
ATTORNEY

SWITCH DEVICE

This invention relates generally to electrical switch devices, and more particularly to switch devices controllable to either an "on" state or "off" state by a magnetic field.

Existing electrical switches usually comprise contacts which are moved into and out of engagement with each other, as by a manually movable switch actuator connected therewith, so as to establish the "on" state or "off" state, respectively, of the switch. By reason of such relatively movable parts physically connected with each other, such existing switches are susceptible to wear and thus tend to breakdown and become unreliable when subject to long repeated use. Further, by reason of their relatively numerous mechanically connected and relatively movable parts, such switches are not susceptible to miniaturization and thus are not adaptable for use in applications where only a minimum of space is available.

Accordingly, it is an object of this invention to provide switch devices in which the switching function, that is, the change from the "off" state to the "on" state, is initiated by relative movement of components that are not in physical contact with each other.

Another object is to provide switch devices, as aforesaid, which are certain and reliable in operation, and which may be made small in size for easy adaptation to a wide variety of applications requiring the performance of switching functions.

Still another object is to provide switch devices, as aforesaid, in which the switching function is controlled by a magnetic field, as from a movable permanent magnet or other source of direct magnetic flux.

In accordance with an aspect of this invention, a switch device comprises a saturable magnetic core, as in a parametron or dual-gap magnetic head, a first winding on the core receiving an AC exciting current and a DC bias current, a second winding on the core included in a resonant circuit in which a current is generated at a resonant frequency one-half the frequency of the AC exciting current only when the total direct magnetic flux influencing the second winding is within predetermined limits established, for example, by a value of a capacitor in the resonant circuit, and a source of additional magnetic flux, such as a magnet, actuable as by movement relative to the core to selectively apply direct magnetic flux to the second winding for coaction with the flux produced by the DC bias current in determining the total direct magnetic flux influencing the second winding, whereby the generation of current in the resonant circuit, and hence the appearance of a resulting output signal from the switch device, may be controlled by movement of the magnet.

In particular applications of switch devices according to the invention, the current generated in the resonant circuit may be rectified, or rectified and amplified, as by a transistor, to provide a DC output signal only when the magnet is in a predetermined position or positions relative to the core.

Switch devices according to this invention have many applications or uses, such as, the performance of switching operations in electronic musical instruments or computers and the control of energizing currents for the field windings of brushless motors, to name a few.

The above, and other objects, features and advantages of this invention, will be apparent in the following detailed description of illustrative embodiments thereof which is to be read in connection with the accompanying drawings, wherein:

FIG. 5 is a schematic side elevational view of a dual-gap magnetic flux responsive head of a type that may be used in still another embodiment of this invention;

FIG. 6 is a schematic sectional view taken along the line VI-VI on FIG. 5;

FIG. 7 is an exploded perspective view of the head of FIGS. 5 and 6 in association with a magnet to control the switching operations in response to relative movements of the magnet and head;

FIG. 8 is a wiring diagram showing the circuits employed in association with the head of FIGS. 5-7;

FIG. 9 is a schematic side elevational view to which reference will be made in explaining the operation of the switch device of FIGS. 5-8;

FIGS. 10 and 11 are graphs to which reference will also be made in explaining the operation of the switch device of FIGS. 5-8;

FIGS. 12 and 13 are schematic side elevational views showing a modification of the switch device of FIGS. 5-8;

FIG. 14 is a graph to which reference will be made in explaining the operation of the switch device of FIGS. 12 and 13;

FIGS. 15 and 16 are graphs to which reference will be made in explaining additional modes of operation of the switch device of FIGS. 5-8;

FIGS. 17 and 18 are wiring diagrams respectively showing other circuits that may be used in connection with switch devices according to this invention;

FIG. 19 is a schematic plan view illustrating a portion of the keyboard of an electronic musical instrument employing switch devices according to this invention;

FIG. 20 is a sectional view taken along the line XX-XX on FIG. 19;

FIG. 21 is a wiring diagram showing circuits that may be employed in connection with the musical instrument of FIGS. 19 and 20;

FIG. 22 is a schematic elevational view showing a switch device according to this invention employed in connection with a key of the keyboard of an electronic computer;

FIG. 23 is a schematic perspective view illustrating a brushless electric motor employing switch devices according to this invention for controlling the supplying of currents to the field windings of the motor;

FIG. 24 is a wiring diagram showing circuits that may be used in connection with the brushless motor of FIG. 23; and FIG. 25 is a diagrammatic representation of the field currents provided by the switch devices for operation of the brushless motor of FIG. 23.

Figure 1:
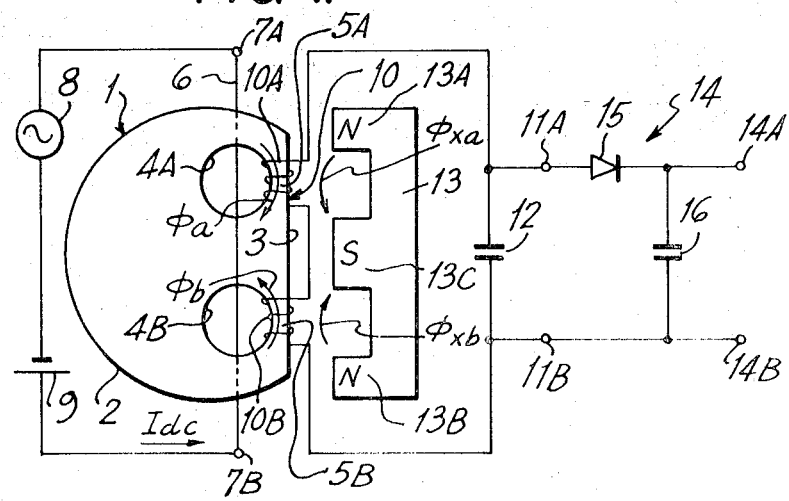
FIG. 1 is a diagrammatic view of a switch device according to an embodiment of this invention.

Referring to the drawings in detail, and initially to FIG. 1 thereof, it will be seen that a switch device in accordance with an embodiment of this invention is there shown to comprise a parametron 1 having a saturable magnetic core 2 which is generally of circular configuration and formed with a chordal straight side 3. A pair of holes or openings 4A and 4B extend through core 2 at space apart locations adjacent straight side 3 so as to leave narrow portions 5A and 5B of the core between straight side 3 and openings 4A and 4B, respectively. A first winding or conductor 6 extends through openings 4A and 4B in opposed directions, for example, upwardly through opening 4A and downwardly through opening 4B, as shown, and is connected, at its ends, to terminals 7A and 7B which are supplied with an AC exciting current, for example, from a source 8, and also with a DC bias current, for example, from a source 9 connected in series with the AC source 8. By reason of the above described arrangement of winding or conductor 6 with respect to core 2, the DC bias current Idc produces magnetic flux in opposite directions in core portions 5A and 5B, for example, as indicated by the arrows $\Phi a$ and $\Phi b$ on FIG. 1.

A second winding or conductor 10 has portion 10A and 10B thereof respectively wound on the core portions 5A and 5B, and such portions 10A and 10B are wound so that voltages induced therein by magnetic fluxes in the core portions 5A and 5B will be of the same phase. The ends of second winding 10 are connected to terminals 11A and 11B and also to the opposite sides of a condenser 12 which, together with second winding 10, constitutes a resonant circuit having a resonant frequency that is one-half of the AC exciting current supplied by the source 8.

Figure 2:
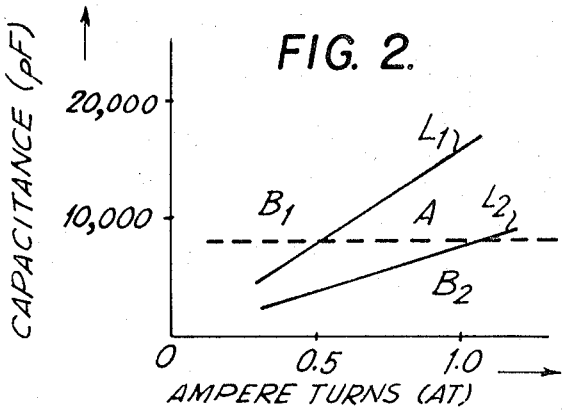
FIGS. 2 and 3 are graphs showing operating characteristics of a portion of the device illustrated in FIG. 1.
Figure 3:
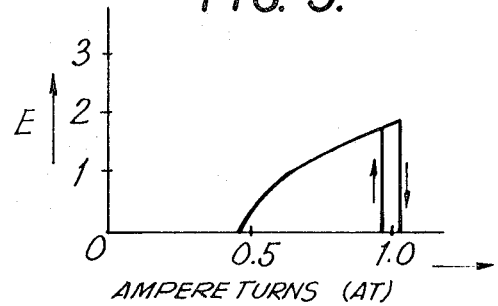

The operating characteristics of the above-described elements of the switch device according to this invention which constitute the parametron 1 will now be described with reference to FIG. 2. In FIG. 2, the ampere turns AT of winding 10 resulting from the direct magnetic flux in core portions 5A and 5B is plotted as the abscissa and the capacitance of condenser 12 is plotted as the ordinate, and the area A between lines $L_1$ and $L_2$ represents combinations of capacitance and ampere turns for which the resonant circuit constituted by winding 10 and condenser 12 will generate a current at one-half the frequency of AC source 8. Further, on FIG. 2, the areas $B_1$ and $B_2$ represent combinations of capacitance of condenser 12 and ampere turns of coil 10 due to direct magnetic flux in core 2 for which the resonant circuit will not be operative. It will be apparent from FIG. 2 that if, for example, the condenser 12 has a capacitance of 8000 pf., the the resonant circuit will be operative to generate a current therein at its resonant frequency so long as the ampere turns of winding 10 is between about 0.5 and 1.0. On FIG. 3, where the ampere turns of winding 10 due to the direct magnetic flux core 2 is again plotted as the abscissa and the voltage E at terminals 11A and 11B is plotted as the ordinate, it will be seen that a voltage output will be obtained at ampere turn values between about 0.5 and 1.0 for the example in which the capacitance of condenser 12 is constant at 8000 pf. and the ampere turns due to the AC exciting current is about 0.4.

Of course, in conventional parametrons, the only source of direct magnetic flux influencing winding 10 is the DC bias current from source 9 and such bias current is selected so that current at the resonant frequency of the circuit constituted by winding 10 and condenser 12 will be produced in such resonant circuit. However, switch devices in accordance with this invention employ the above described characteristic of parametrons, namely, the fact that the resonant circuit constituted by coil or winding 10 and condenser 12 is operative to generate a current therein only when the direct magnetic flux influencing winding 10 is within predetermined limits, in order to perform a switching function. More specifically, in accordance with this invention, the direct magnetic flux influencing winding 10 is varied by an external magnetic source, for example a movable permanent magnet 13, in order to control the generation of the current in the resonant circuit in accordance with the variations in the direct magnetic flux that result from movement of the magnet.

For example, in the embodiment of the invention illustrated in FIG. 1, the DC bias current Idc from source 9 may be selected so that the direct magnetic flux produced thereby to influence winding 10 is insufficient to cause generation of current in the resonant circuit constituted by winding 10 and condenser 12, that is, so that the characteristics of the parametron 1 are within the area $B_1$ on FIG. 2. Thus, in the absence of the magnet 13, no output appears at terminals 11A and 11B. However, magnet 13, when positioned relative to core 1 as shown on FIG. 1, produces direct magnetic flux, as indicated by the arrows $\Phi_{xa}$ and $\Phi_{xb}$, in the same direction as the flux $\Phi_a$ and the flux $\Phi_b$. Thus, portions 10A and 10B of winding 10 are influenced by the direct magnetic flux from the DC bias current and also by the direct magnetic flux from magnet 13 in order to shift the operating characteristic of parametron 1 into the region or area A on FIG. 2. Thus, it will be seen that, when magnet 13 is in the position shown on FIG. 1, parametron 1 is in its operating condition and an AC Voltage appears across terminals 11A and 11B at a frequency which is one-half the frequency of the AC exciting source 8. When magnet 13 is moved relative to core 1 so that the magnetic flux from the magnet is no longer added to the direct magnetic flux from the DC bias current in the manner shown, then parametron 1 returns to its inoperative condition and no output appears at terminals 11A and 11B.

Since winding or conductor 6 in the embodiment of FIG. 1 is arranged with respect to core 2 so that the fluxes $\Phi_a$ and $\Phi_b$ produced in core portions 5A and 5B in response to the DC bias current are in opposed directions, magnet 13 is E-shaped as shown, with two outer poles 13A and 13B OF N-polarity and a central pole 13C of S-polarity to provide the fluxes $\Phi_{xa}$ and $\Phi_{xb}$ in opposed directions.

It will be apparent that the control of the described switch device between its "on" state and its "off" state is effected merely by movement of magnet 13 relative to core 2 and that there is no need for physical engagement of the magnet with any other portion of the described switch device. Thus, the switching function can be repeatedly performed without wear, as distinguished from existing switches in which the switching function involves the engagement and disengagement of contact elements.

Although the switch device shown in FIG. 1 employs a parametron 1 in which the DC bias current is selected so that, in the absence of magnet 13, the parametron is in the region or area $B_1$ on FIG. 2 and thus does not operate, and further in which the magnet 13 is arranged so that, when disposed adjacent core 2 in the position shown on FIG. 1, the parametron characteristic is shifted into the area A on FIG. 2, switch devices according to this invention may have other arrangements. For example, the DC bias current may be selected so that, in the absence of magnet 13, the direct magnetic flux from the bias current will cause the characteristic of the parametron 1 to lie in the area or region $B_2$ on FIG. 2 and, in that case, magnet 13 is arranged so that, when such magnet is in the position shown on FIG. 1, the direct magnetic flux produced in core portions 5A and 5B by reason of the magnet 13 will oppose the direct magnetic flux resulting from the DC bias current so as to shift the characteristic of the parametron into the area A for once again causing an output to appear as terminals 11A and 11B. In the last mentioned modification of a switch device according to this invention, the outer poles 13A and 13B of magnet 13 would be of S-polarity, while the central pole 13C would be of N-polarity.

If it is desired to obtain a DC output from the described switch device when the latter is in its "on" state, a rectifying output circuit 14 may be connected with terminals 11A and 11B and, as shown on FIG. 1, circuit 14 may include a diode 15 and condenser 16 so that, when a current is generated in the resonant circuit constituted by winding 10 and condenser 12, a DC voltage will appear across the output terminals 14A and 14B of circuit 14.

In still another possible modification of the switch device shown on FIG. 1, the DC bias current from source 9 may be selected so that, in the absence of magnet 13, the characteristic of parametron 1 lies in the area A on FIG. 2 to provide an output at terminals 14A and 14B and, in that case, magnet 13 is arranged so that, upon the positioning of the magnet as shown on FIG. 1, the direct magnet flux resulting therefrom is either added to, or subtracted from the direct magnetic flux resulting from the DC bias current to shift the characteristic of parametron 1 either into the area $B_2$ or the area $B_1$, respectively, on FIG. 2, whereby to halt the operation of the parametron, that is, to convert the switch device to its "off" state at which no voltage appears at terminals 14A and 14B.

Figure 4:
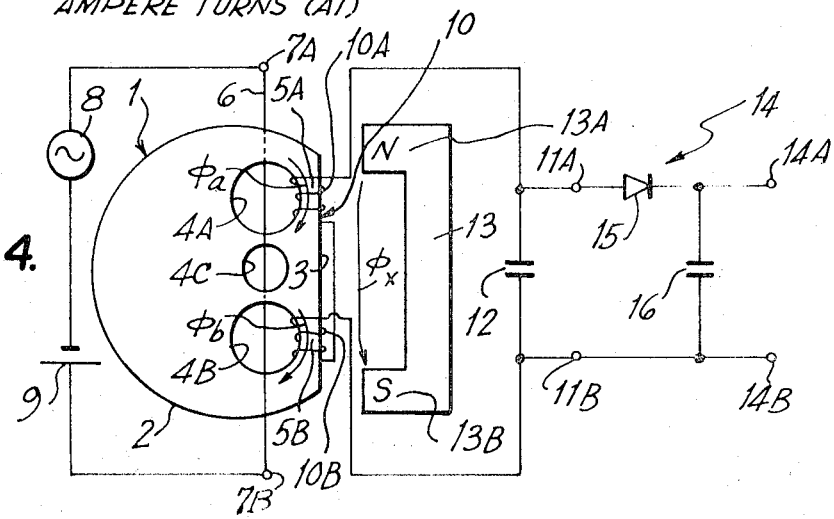
FIG. 4 is a view similar to that of FIG. 1, but showing another embodiment of the invention.

Referring now to FIG. 4, it will be seen that, in the embodiment of the invention there illustrated, the magnetic core 2 of parametron 1 is formed with an opening 4C between the openings 4A and 4B so that the first winding or conductor 6 may pass through both openings 4A and 4B in the same direction. More specifically, in FIG. 4, conductor 6 passes upwardly through opening 4A, downwardly through intermediate opening 4C and then upwardly through opening 4B. Thus, the fluxes $\Phi_a$ and $\Phi_b$ induced in core portions 5A and 5B by the DC bias current are in the same direction and, accordingly, magnet 13 may be a simple U-shaped magnet, as shown, so that when such magnet is positioned adjacent side 3 of core 2, the direct magnetic flux $\Phi_x$ will act in the same direction as the fluxes $\Phi_a$ and $\Phi_b$. The switch device of FIG. 4 will operate in the same manner as the device described with reference to FIG. 1, that is, to provide an output at terminals 14A and 14B when magnet 13 is disposed adjacent side 3 of core 2, and to cause the removal of such output when magnet 13 is moved away from core 2.

In place of the core 2 of a parametron 1 included in the switch devices of the previously described embodiments, switch devices according to this invention may include a dual-gap magnetic flux responsive head 20, for example, as shown on FIGS. 5-8. Head 20 may include a saturable magnetic core 21 having a pair of parallel core legs 21A and 21B connected, at one end, by a cross piece 21C, and a pair of generally C-shaped magnetic yokes 22A and 22B arranged in opposing relation with core 21 therebetween. At one end, yokes 22A and 22B abut, and are suitably secured to opposite sides of one end portion of core 21, while the other ends of yokes 22A and 22B are adjacent to the crosspiece 21C of core 21, but spaced therefrom to define air gaps $g_a$ and $g_b$ (FIG. 5). Although the gaps $g_a$ and $g_b$ are referred to as "airgaps" it is apparent that such gaps may be filled with a nonmagnetic material, such as, a nonmagnetic alloy of copper and beryllium or a plastic resin.

As shown on FIG. 6, the first winding 6 is wound about both core legs 21A and 21B and has its ends connected to terminals 7A and 7B which, as shown on FIG. 8, are supplied with an AC exciting current by the source 8 and a DC bias current by a source 9. Thus, the DC bias current flowing through winding 6 produces magnetic flux in the same direction in each of core legs 21A and 21B, as indicated by the arrows $\Phi_a$ and $\Phi_b$ on FIG. 6. The second winding 10 has its portions 10A and 10B wound on core legs 21A and 21B, respectively, with such portions 10A and 10B being wound on the respective core legs in opposite directions, as shown on FIG. 6, so that voltages induced in winding portions 10A and 10B by the magnetic flux in the respective core legs are of the same polarity or additive. Although first winding 6 is shown wound about core legs 21A and 21B, it will be apparent that such winding could be provided instead on either one of the magnetic yokes 22A and 22B. In either case, the core legs 21A and 21B correspond to the narrow core portions 5A and 5B of the embodiments of this invention previously described with reference to FIGS. 1 and 4. The ends of winding 10 are connected to terminals 11A and 11B between which there is connected the condenser 12 so that winding 10 and condenser 12 constitute a resonant circuit having a resonant frequency which is one-half the frequency of the AC exciting source 8, and in which a current is generated only when the direct magnetic flux influencing winding portions 10A and 10B is within predetermined limits, for example, corresponding to the area A on FIG. 2.

The switch device presently being described further includes an external magnetic source 13a, for example, in the form of a permanent magnet as shown on FIG. 7, which is magnetized in the direction across gaps $g_a$ and $g_b$. Magnet 13a may be suitably supported for movement in a rectilinear path which extends adjacent gaps $g_a$ and $g_b$ and is spaced from head 20. The path of movement of magnet 13a may be in the direction indicated at x—x on FIG. 7, that is, in the direction across the gaps of head 20.

Assuming that the DC bias current from source 9 is selected so that the fluxes $\Phi_a$ and $\Phi_b$ resulting therefrom correspond to the area $B_1$ on FIG. 2, then it is apparent that, in the absence of any direct magnetic flux from magnet 13a acting on winding portions 10A and 10B, no output will appear at terminals 11A and 11B on FIG. 8. When magnet 13a is disposed as shown in full lines on FIG. 9, that is, with its center aligned with the center of head 20, the fluxes $\Phi_a$ and $\Phi_b$ which respectively pass through core 21 and yoke 22A and through yoke 22B and core 21 cancel each other within core 21, and thus there is no resultant direct magnetic flux in core 21 produced by magnet 13a so that no output appears at terminals 11A and 11B. However, as magnet 13a is displaced from the centered position relative to head 20 in the direction parallel to the magnetization of magnet 13a, for example, to the right as viewed on FIG. 9, the magnetic flux $\Phi_b$ becomes larger than the magnetic flux $\Phi_a$ with the result that there is a resultant direct magnetic flux from magnet 13a acting in the same direction in core legs 21A and 21B as the flux $\Phi_a$ and $\Phi_b$ due to the DC bias current. Therefore, the total direct magnetic flux acting on winding portions 10A and 10B may be made to correspond to the area A on FIG. 2, whereby an output then appears at terminals 11A and 11B on FIG. 8.

Alternatively, the DC bias current from source 9 on FIG. 8 may be selected so that, in the absence of any resultant direct magnetic flux in core 21 produced by magnet 13a, that is, when magnet 13a is in its centered position as shown in full lines on FIG. 9, the direct magnetic flux resulting from the DC bias current alone will correspond to the area A on FIG. 2 and thus cause an output to appear at terminals 11A and 11B. With such arrangement it may be assumed that the resultant direct magnetic flux produced in core 21 by magnet 13a is as indicated at $H_a$ on FIG. 10 in which displacements of magnet 13a from its centered position $a_0$ are plotted on the abscissa and the resultant magnetic flux in core 21 is plotted on the ordinate. As magnet 13a is displaced toward the right from its centered position shown on FIG. 9, the resultant magnetic flux in core 21 from magnet 13a is shown to be in the same direction as the magnetic flux in the core resulting from the DC bias current and progressively increases up to the position $a_2$ and thereafter decreases with continuing displacement of the magnet toward the right. When the magnetic flux from magnet 13a acting in the same directions as the magnetic flux $\Phi_a$ and $\Phi_b$ reaches the value $\Phi_1$, the total direct magnetic flux acting on winding portions 10A and 10B may correspond to the area $B_2$ on FIG. 2 so that the output is removed from terminals 11A and 11B and the switch device is in its "off" state. Further displacement or movement of magnet 13a reduces the resulting flux therefrom in core 21 to the value $\Phi_2$ on FIG. 10, whereupon the total direct magnetic flux acting on winding portions 10A and 10B again corresponds to the area A on FIG. 2.

Thus, as shown on FIG. 11, in which displacements of the magnet are plotted on the abscissa and the voltage output at terminals 11A and 11B is plotted on the ordinate, the switch device will be in its "on" state when magnet 13a is in its centered position and will remain in its "on" state during displacement of the magnet from left to right, as viewed on FIG. 9, until the center of the magnet reaches the position $x'_1$ on FIG. 11. During further movement of the magnet in the mentioned direction, the switch device will remain in its "off" state until the center of the magnet reaches the position $x'_2$, whereupon further displacement of the magnet will restore the switch device to its "on" state. During return movement of the magnet, that is, in the direction from right to left on FIG. 9, the switch device will be in its "on" state until the center of the magnet attains the position $x_2$ and then will remain in its "off" state until the center of the magnet attains the position $x_1$ whereupon further displacement of the magnet from right to left will restore the switch device to its "on" state. By reason of the illustrated spacing between the position $x_1$ and $x'_1$ and the positions $x_2$ and $x'_2$, "chattering" of the switch device is avoided, for example, if the magnet 13a, in moving from left to right, is moved just beyond the position $x'_2$ so as to condition the switch device in its "on" state.

In a specific example of the switch device of the type described above with reference to FIGS. 5-8, the first winding 6 and second winding 10 of head 20 are provided with 20 turns and 80 turns, respectively, the frequency of the AC exciting source 8 is 150 kHz. the capacitance of condenser 12 is 0.02 microfarads, and the DC bias current and the AC exciting current are each 20 ma. With the foregoing conditions, an output of 2.0 V is provided at terminals 11A and 11B so long as the resultant magnetic flux from magnet 13a acting in core 21 in the same direction as the magnetic flux from the DC bias current is less than 2.0 Maxwell. Further, the magnet 13a is sufficiently magnetized to provide a resultant magnetic flux of about 5.0 Maxwell in core 21 when such magnet is at the position indicated at $a_2$ on FIG. 10.

Referring now to FIG. 12, it will be seen that a switch device according to this invention which is generally of the type described above with reference to FIGS. 5-8, may have a modified form of external magnetic source 13'a which essentially consists of two magnets of opposed polarity constituting the opposite lateral portions of the magnetic source. When source 13'a is centered with respect to head 20, as shown on FIG. 12, the fluxes $\Phi_a$ and $\Phi_b$ are in the same direction in core 21 to provide a maximum resultant magnetic flux, as indicated at $b_0$ on FIG. 14. However, as source 13'a is displaced toward the left from its centered position, as shown on FIG. 13, or toward the right from the centered position, the fluxes $\Phi_a$ and $\Phi_b$ act in opposite directions in core 21 and thus progressively reduce the resultant magnetic flux until the latter is reduced to zero, for example, as at $b_1$ and $b'_1$, respectively, on FIG. 14. Further displacement of the magnetic source 13'a toward the left or right will cause reversal of the direction of the resultant magnetic flux therefrom in core 21, for example, as at $b_2$ and $b'_2$ on FIG. 14.

With the arrangement described above in connection with FIGS. 12, 13 and 14, if the DC bias current is selected to correspond to the areas A on FIG. 2 in the absence of any resultant magnetic flux in core 21 from source 13'a, then the positioning of magnetic source 13'a in its centered position, where the resultant magnetic flux therefrom is at a maximum and added to the magnetic flux from the DC bias current, may be made to cause the total direct magnetic flux to correspond to the area $B_2$ on FIG. 2 and therefore dispose the switch device in its "off" state. Further, it will be apparent that movement of magnetic source 13'a toward the right or left from its centered position will eventually reduce the total direct magnetic flux in core 21 sufficiently to correspond to the area A on FIG. 2, and thereby to condition the switch device in its "on" state.

Although the magnet 13 of the switch device described with reference to FIGS. 5-8 has been described as being moved in the direction x—x to achieve the switching function, it is to be noted that the switching function can also be attained by movements of the magnet 13 in the directions y—y or z—z on FIG. 7. Thus, for example, the magnet 13 magnetized in the direction across gaps $g_a$ and $g_b$ may be movable in the direction y—y while being maintained with its center laterally displaced from the center of head 20. So long as a portion of magnet 13 remains proximate to head 20, the maximum resultant magnetic flux $\Phi$ from magnet 13 will be produced in core 21, for example, as between the positions $y_1$ and $y_2$ on FIG. 15. With further displacement of magnet 13 in the direction y—y beyond position $y_1$ or $y_2$, the resultant magnetic flux $\Phi$ in core 21 will be progressively reduced. Thus, the DC bias current from source 9 in FIG. 8 may be selected so that, when the magnet 13 is moved in the direction y—y, the switch device will be in the "off" state so long as magnet 13 is between the positions $y_1$ and $y_2$ on FIG. 15 and will be switched to the "on" state only in response to movement of the magnet beyond positions $y_1$ and $y_2$. Conversely, the DC bias current may be selected so that the switch device is in its "on" state when magnet 13 is between positions $y_1$ and $y_2$ and is switched to its "off" state in response to movement of magnet 13 beyond position $y_1$ or $y_2$.

If magnet 13 is moved in the direction z—z on FIG. 7 while being maintained with its center displaced laterally from the center of head 20, the resultant magnetic flux $\Phi$ from magnet 13 will be a maximum when the magnet is close to head 20 and will progressively decrease in response to its movement away from the head, for example, as shown on FIG. 16. Thus, here again, the DC bias current from source 9 can be selected to provide for the "on" or "off" state of the switch device when the magnet is close to head 20 and to switch the switch device to the "off" or "on" state, respectively, when the magnet is moved a predetermined distance in the direction z—z away from head 20.

In place of the arrangements shown on FIGS. 1 and 8 for supplying the AC exciting current and the DC bias current to the first winding 6, switch devices according to this invention may have other circuit arrangements performing the same function, for example, as shown on FIGS. 17 and 18. More specifically, in the circuits shown on FIGS. 17 and 18, the AC exciting source 8 is connected to the primary winding of a transformer 24, and the secondary winding of such transformer is connected, at one end, to terminal 7A, while the other end of the secondary winding of transformer 24 is connected through a resistor 25 to a source of DC bias current indicated at 9' and is further connected through a condenser 26 to terminal 7B and also to ground. The effect of the circuits shown on FIGS. 17 and 18 is once again to supply to winding 6 both an AC exciting current and a DC bias current. Furthermore, the output circuit 14 described above in connection with FIG. 1 may be employed in the circuit arrangement of FIG. 17 to provide a DC voltage at terminals 14A and 14B when the switch device is in its "on" state. Alternatively, as shown on FIG. 18, such output circuit 14 may be replaced by an output circuit 14' which acts to both rectify and amplify the output obtained at terminals 14A and 14B when the switch device is in its "on" state. The circuit 14' is shown on FIG. 18 to comprise a transistor 27 having its base connected to terminal 11A, its collector connected to output terminal 14A and through a resistor 28 to a negative bias at terminal 29, and its emitter connected to terminals 11B and 14B and to ground with a condenser 16' connected between output terminals 14A and 14B.

Switch devices according to this invention may find numerous applications. For example, as shown on FIGS. 19 and 20, switch devices according to this invention may be employed for controlling the production of various selected musical tones in an electronic musical instrument such as an electric organ. In such application of switch devices according to this invention, keys 30a, 30b,—30n of the instrument keyboard are pivoted, intermediate their ends, on a shaft 31 and, at their ends 32a, 32b—32n, the keys carry respective magnets 13'a, 13'b,—13'n. Associated with the magnets 13'a, 13'b—13'n are respective heads 20a, 20b—20n which are fixedly located so that each of the magnets is displaced from the respective head in the normal position of the key carrying the magnet, and further so that each magnet moves to a position adjacent the respective head when the key is depressed. Further, as shown on FIG. 21, a single circuit similar to that described with reference to FIGS. 17 and 18 is provided for supplying the first windings 6a, 6b—6n of the several heads with the requisite AC exciting current and with a selected DC bias current so that the resonant circuit of each of the heads 20a, 20b—20n generates an output only when the respective magnet is moved to its position adjacent the head in response to depression of the respective key. Terminals 11A of the several switch devices are connected to the bases of respective transistors 33a, 33b—33n, whereas the terminals 11B of the several switch devices are connected to ground. Generating sources 34a, 34b—34n are connected between ground and the emitters of transistors 33a, 33b—33n, respectively, and the collectors of the several transistors are connected to output terminal 14A. The other output terminal 14B is connected to ground and a resistor 35 and condenser 36 are connected in parallel between terminal 14A and ground. The output terminals 14A and 14B may be connected with an amplifier 37 which is in turn connected with a loudspeaker 38 which is operatively to audibly produce sounds at the frequencies of output signals received at the terminals 14A and 14B. It will be apparent that each of the transistors 33a, 33b—33n is turned "on" only when the respective switch device is in its "on" state in response to depression of the respective key of the keyboard. Further, the generating sources 34a, 34b —34n are operative to generate electrical signals at respective frequencies corresponding to various selected musical tones and such output signals will reach terminals 14A and 14B only when the respective transistors are turned "on" as described above. Thus, by depressing the keys of the keyboard in any desired sequence, a corresponding sequence of audible musical sounds will be reproduced by the loudspeaker 38.

Another possible application of switch devices according to this invention is in the input keyboard of electronic computers. For example, as shown on FIG. 22, each key 40 of the input keyboard may have a stem 41 depending therefrom and suitably guided for vertical movement, for example, in openings 43 provided in a frame 42, with a spring 44 acting on key 40 to yieldably retain the key in its normal elevated position. Further, a switch device according to this invention is associated with each key 40 and has its magnet 13' fixed or otherwise connected to the stem 41 so as to be displaced from the respective head 20 when key 40 is in its normal elevated position. The switch device is arranged, as previously described herein, so that, with magnet 13' in the position shown on FIG. 22, no output is derived from the switch device. However, when key 40 is depressed to bring magnet 13' to a position adjacent head 20, the switch device provides an output which is characteristic of the value represented by the depressed key. In the arrangement shown on FIG. 22, the movements of magnet 13' effected by depression of key 40 may correspond to movements in the direction of the axis y—y, as previously described herein with reference to FIG. 15. The several switch devices provided in a computer, for example, as indicated on FIG. 22, may be embodied in circuits of the type shown on FIG. 19, in which case each of the generators 34a, 34b—34n will then generate a signal characteristic of the mathematical value represented by the respective key of the input keyboard.

Still another application of switch devices according to this invention is in brushless electric motors. For example, as shown on FIG. 23, a brushless motor according to this invention having three field windings 53a, 53b and 53c angularly spaced apart by 120° and intended to be energized in succession so as to cause rotation of a rotor magnet 54 on a motor shaft 55. The motor according to this invention is further provided with a control rotor 51 fixed on shaft 55 and carrying a permanent magnet 52 which is magnetized in the axial direction and extends over approximately one-half the circumference of control rotor 51. Heads 20a, 20b and 20c are angularly spaced apart about control rotor 51 similarly to the angular spacing of the field windings, and from parts of switch devices according to this invention. The heads 20a, 20b and 20c are connected in the circuit arrangement shown on FIG. 24 so that their first windings 6a, 6b and 6c will receive an AC exciting current and a DC bias current from a circuit similar to that described previously with reference to FIGS. 17 and 18. The DC bias current is selected so that each switch device will be in its "on" state only when the magnet 52 is rotationally positioned so as to be adjacent or in confronting relation to the respective head. It will be apparent that the movement of magnet 52 relative to each of the heads corresponds to the movement in the direction y—y previously referred to with reference to FIG. 15. The outputs from the several switch devices are used to control transistors 33a, 33b and 33c so that each transistor is turned "on" only when the respective switch device is in its "on" state. The field windings 53a, 53b and 53c are seen to be connected between a power source 56 and the transistors 33a, 33b and 33c, respectively, so that each field winding receives the field current during the period when the respective transistor is turned "on." Thus, as shaft 55 is rotated, the switch devices according to this invention control the field currents Ia, Ib and Ic (FIG. 25) to the respective windings 53a, 53b and 53c so that such field currents are successively out of phase by 120°, and further so that each field winding receives field current for approximately one-half revolution of shaft 55.

By reason of the fact that there is no physical contact between magnet 52 and heads 20a, 20b and 20c, the control of the field currents is effected without the possibility of wear, as in a conventional electric motor having brushes and slip rings or commutators.

Although illustrative embodiments of this invention have been described in detail herein with reference to the accompanying drawings, it is to be understood that the invention is not limited to those precise embodiments, and that various changes and modifications may be effected by one skilled in the art without departing from the scope or spirit of the invention.

What is claimed is:

1. A switch device comprising a saturable magnetic core, first conducting means disposed in relation to said core to produce magnetic flux in the latter in response to current flow in said conducting means, means for supplying to said first conducting means an AC exciting current of a predetermined frequency and a DC bias current, second conducting means wound on said core and positioned to be influenced by the magnetic flux produced in said core by said current flow in the first conducting means, resonant circuit means including said second conducting means and having a resonant frequency which is one-half said predetermined frequency of the AC exciting current, said resonant circuit means being operative to generate a current therein at said resonant frequency only when the total direct magnetic flux influencing said second conducting means is within predetermined limits, an additional magnetic flux source actuable to selectively apply direct magnetic flux therefrom to said second conducting means for coaction with the direct magnetic flux in said core resulting from said DC bias current in determining said total direct magnetic flux influencing said second conducting means, whereby the generation of current in said resonant circuit means is controlled by selective actuation of said additional magnetic flux source; and output means connected with said resonant circuit means to provide an output signal in response to said generation of current in said circuit means.

2. A switch device according to claim 1, in which said output means includes rectifying means so that said output signal is a DC voltage.

3. A switch device according to claim 2, in which said rectifying means includes transistor means by which said output signals is also amplified.

4. A switch device according to claim 1, in which said additional magnetic flux source is a magnet and is actuable by movement of said magnet relative to said core.

5. A switch device according to claim 1, in which said core, first and second conducting means, resonant circuit means and means for supplying the AC and DC currents to said first conducting means comprise a parametron.

6. A switch device according to claim 1, in which said core and first and second conducting means are parts of a dual-gap, magnetic flux responsive head.

7. A switch device according to claim 1, in which said resonant circuit means includes a capacitor connected with said second conducting means.

8. In combination:

Means constituting a source of an AC exciting current of predetermined frequency and of a DC bias current;

a plurality of switch devices each comprising a saturable magnetic core, first conducting means connected with said source means and disposed in relation to said core to produce magnetic flux in the latter in response to current flow in said conducting means, second conducting means wound on said core and positioned to be influenced by said magnetic flux produced in said core, resonant circuit means including said second conducting means and having a resonant frequency which is one-half said predetermined frequency, said resonant circuit means being operative to generate a current therein at said resonant frequency only when the total direct magnetic flux influencing said second conducting means is within predetermined limits, and a magnet movable relative to said core to selectively apply direct magnetic flux therefrom to said second conducting means for coaction with the direct magnetic flux resulting from said DC bias current in determining said total direct magnetic flux influencing said second conducting means, whereby the generation of current in said resonant circuit means is controlled by selective movement of said magnet;

a manually actuable control member for each of said switch devices connected to the respective magnet for moving the latter between first and second positions where the respective resonant circuit means is inoperative and operative, respectively, to generate said current at the resonant frequency; and signal producing means for each of said switch devices connected with said resonant circuit means of the respective switch device and responding to the generation of said current at the resonant frequency in the resonant circuit means to provide a distinctive output signal.

9. The combination according to claim 8, in which each of said signal producing means has an output signal of a respective frequency, and further comprising electroacoustic transducer means connected with said signal producing means so that musical sounds will issue from said transducer means in response to the selective actuation of the control members.

* * * * *